United States Patent
Shoda et al.

(10) Patent No.: US 11,543,820 B2
(45) Date of Patent: Jan. 3, 2023

(54) VEHICLE CONTROL APPARATUS, VEHICLE CONTROL METHOD, AND STORAGE MEDIUM

(71) Applicant: HONDA MOTOR CO., LTD., Tokyo (JP)

(72) Inventors: Yasushi Shoda, Wako (JP); Junpei Noguchi, Wako (JP); Yuki Hara, Wako (JP); Ryoma Taguchi, Tokyo (JP); Yuta Takada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 401 days.

(21) Appl. No.: 16/822,086

(22) Filed: Mar. 18, 2020

(65) Prior Publication Data

US 2020/0310430 A1 Oct. 1, 2020

(30) Foreign Application Priority Data

Mar. 28, 2019 (JP) .............................. JP2019-064027

(51) Int. Cl.
  *G05D 1/00* (2006.01)
  *G05D 1/02* (2020.01)
  *G06V 40/20* (2022.01)
  *G06V 40/16* (2022.01)

(52) U.S. Cl.
  CPC ......... *G05D 1/0088* (2013.01); *G05D 1/0212* (2013.01); *G06V 40/167* (2022.01); *G06V 40/20* (2022.01); *G05D 2201/0212* (2013.01); *G05D 2201/0213* (2013.01)

(58) Field of Classification Search
  None
  See application file for complete search history.

(56) References Cited

U.S. PATENT DOCUMENTS

| | | | |
|---|---|---|---|
| 2015/0251697 A1* | 9/2015 | Lavoie .................. | B62D 13/06 701/523 |
| 2020/0021961 A1* | 1/2020 | Li ........................ | G05D 1/0022 |
| 2020/0043344 A1* | 2/2020 | Shimizu .................. | G08G 1/00 |
| 2020/0225680 A1* | 7/2020 | Shitara ................. | G08B 27/001 |

FOREIGN PATENT DOCUMENTS

JP  2006-069298  3/2006

* cited by examiner

*Primary Examiner* — James M McPherson
(74) *Attorney, Agent, or Firm* — Amin, Turocy & Watson, LLP

(57) ABSTRACT

A vehicle control apparatus includes: a recognizer which is configured to recognize a motion of the face of a user present outside a vehicle; a determiner which is configured to determine a stop position of the vehicle on the basis of the motion of the face recognized by the recognizer; and a driving controller which controls at least the speed of the vehicle such that the vehicle is caused to stop at the stop position determined by the determiner.

7 Claims, 15 Drawing Sheets

VEHICLE CONTROL APPARATUS, VEHICLE CONTROL METHOD, AND STORAGE MEDIUM

CROSS-REFERENCE TO RELATED APPLICATION

This application is based upon and claims the benefit of priority from Japanese Patent Application No. 2019-064027, filed Mar. 28, 2019, the entire content of which is incorporated herein by reference.

BACKGROUND

Field of the Invention

The present invention relates to a vehicle control apparatus, a vehicle control method, and a storage medium.

Description of Related Art

A technology for detecting the position of a pedestrian around a vehicle and radiating light to the vicinity of the detected pedestrian is known (refer to Japanese Unexamined Patent Application, First Publication No. 2006-069298, for example).

SUMMARY

However, in the conventional technology, remote control of a vehicle on the basis of a motion of the face of a user located outside the vehicle was not studied.

Aspects of the present invention provide a vehicle control apparatus, a vehicle control method, and a storage medium which can remotely control a vehicle on the basis of a motion of the face of a user located outside the vehicle.

A vehicle control apparatus, a vehicle control method, and a storage medium according to the present invention employ the following configurations.

(1) An aspect of the present invention is a vehicle control apparatus including: a recognizer configured to recognize a motion of the face of a user present outside a vehicle; a determiner configured to determine a stop position of the vehicle on the basis of the motion of the face recognized by the recognizer; and a driving controller configured to control at least the speed of the vehicle such that the vehicle is caused to stop at the stop position determined by the determiner.

According to an aspect (2), in the vehicle control apparatus according to the aspect (1), seats arranged in at least two rows in a traveling direction and a cargo compartment are provided in the vehicle, the recognizer is configured to recognize a line of sight of the user as the motion of the face, and the determiner is configured to determine, as the stop position, any of a first position at which the user is closest to a seat in a first row, a second position at which the user is closest to a seat in a second row, and a third position at which the user is closest to the cargo compartment on the basis of the line of sight recognized by the recognizer.

According to an aspect (3), in the vehicle control apparatus according to the aspect (2), the determiner is configured to change the stop position when the recognizer has recognized a first gesture after the vehicle has moved to the stop position, and is configured to redetermine the stop position when the recognizer has recognized a second gesture different from the first gesture after the vehicle has moved to the stop position.

According to an aspect (4), in the vehicle control apparatus according to the aspect (3), the first gesture is an action that the user takes when the user agrees to the stop position and the second gesture is an action that the user takes when the user does not agree to the stop position.

According to an aspect (5), in the vehicle control apparatus according to the aspect (3) or (4), the determiner is configured to redetermine the stop position on the basis of the line of sight recognized by the recognizer when the recognizer has recognized the second gesture.

According to an aspect (6), in the vehicle control apparatus according to any one of the aspects (3) to (5), the driving controller is configured to cause the vehicle to move to the redetermined stop position when the stop position is redetermined by the determiner.

(7) Another aspect of the present invention is a vehicle control method, using an in-vehicle computer, including: recognizing a motion of the face of a user present outside a vehicle; determining a stop position of the vehicle on the basis of the recognized motion of the face; and controlling at least the speed of the vehicle such that the vehicle is caused to stop at the stop position.

(8) Another aspect of the present invention is a computer-readable non-transitory storage medium storing a program for causing an in-vehicle computer to execute: recognition of a motion of the face of a user present outside a vehicle; a process of determining a stop position of the vehicle on the basis of the recognized motion of the face; and control of at least the speed of the vehicle such that the vehicle is caused to stop at the stop position.

According to any of the aspects (1) to (8), it is possible to remotely control a vehicle on the basis of a motion of the face of a user located outside the vehicle.

DESCRIPTION OF EMBODIMENTS

Hereinafter, a vehicle control apparatus, a vehicle control method, and a storage medium of the present invention will be described with reference to the drawings.

First Embodiment

[Overall Configuration]

Figure 1:
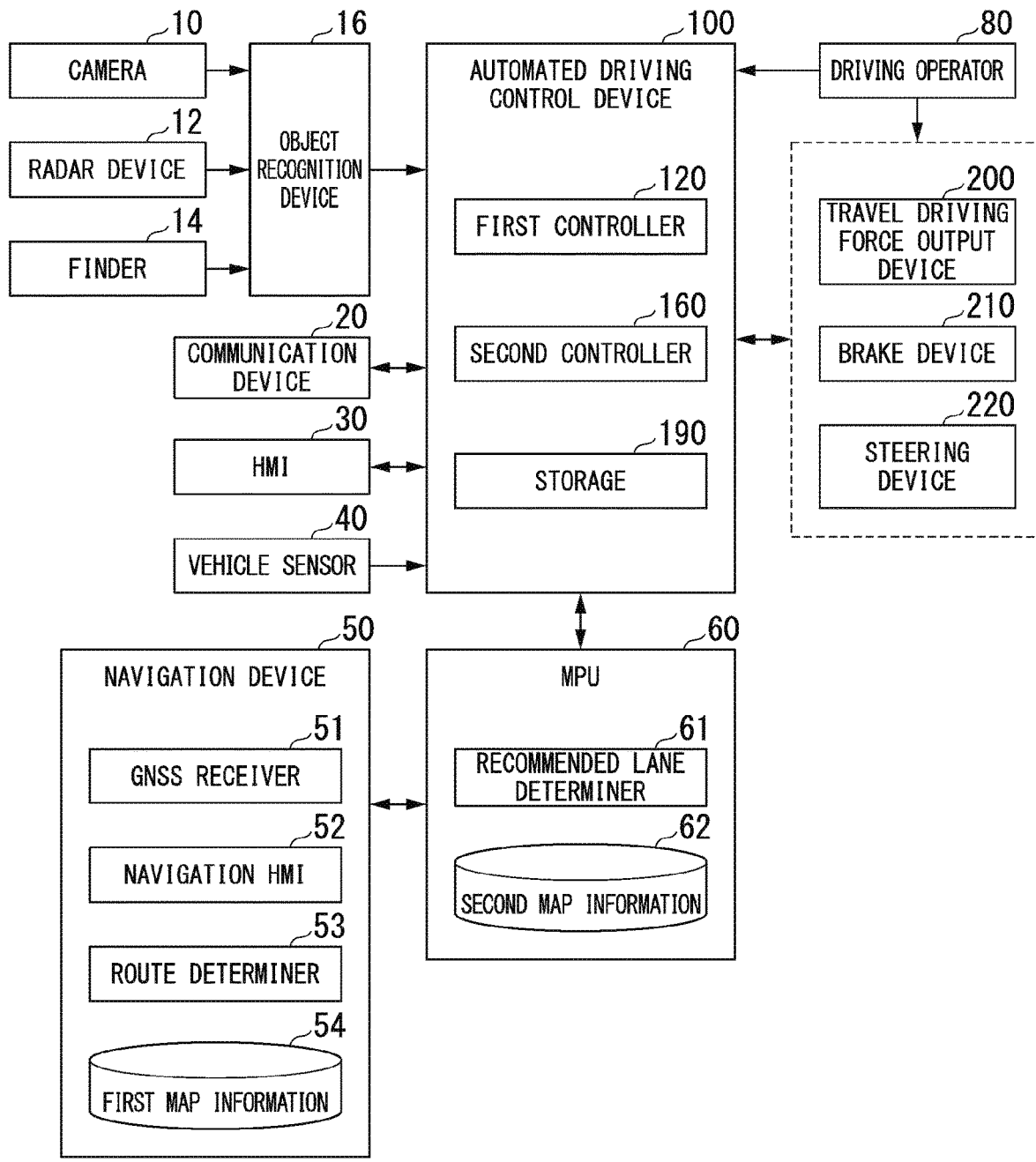
FIG. 1 is a configuration diagram of a vehicle system using a vehicle control apparatus according to an embodiment.

FIG. 1 is a configuration diagram of a vehicle system 1 using a vehicle control apparatus according to an embodiment. A vehicle in which the vehicle system 1 is mounted is, for example, a vehicle such as a two-wheeled vehicle, a three-wheeled vehicle, or a four-wheeled vehicle. A driving source thereof may include an internal combustion engine such as a diesel engine or a gasoline engine, an electric motor, or a combination thereof. The electric motor operates using power generated by a power generator connected to the internal combustion engine or discharge power of a secondary battery or a fuel cell.

The vehicle system 1 includes, for example, a camera 10, a radar device 12, a finder 14, an object recognition device 16, a communication device 20, a person machine interface (HMI) 30, a vehicle sensor 40, a navigation device 50, a map positioning unit (MPU) 60, a driving operator 80, an automated driving control device 100, a travel driving force output device 200, a brake device 210, and a steering device 220. These devices or equipment are connected to each other by a multiplex communication line such as a controller area network (CAN) communication line, a serial communication line, a wireless communication network, or the like. The configuration shown in FIG. 1 is merely an example, and a part of the configuration may be omitted or another configuration may be added.

The camera 10 is, for example, a digital camera using a solid-state imaging device such as a charge coupled device (CCD) or a complementary metal oxide semiconductor (CMOS). The camera 10 is attached to the front, side, back, or the like of a vehicle in which the vehicle system 1 is mounted (hereinafter, a host vehicle M). For example, seats in at least two rows are arranged in a traveling direction inside the host vehicle M.

For example, the camera 10 is attached to an upper portion of a front windshield, a rear surface of a rearview mirror, or the like when a front view image of the host vehicle M is captured, attached to a side windshield or the like when a side view image of the host vehicle M is captured, and attached to a rear windshield, a trunk lid that is a lid of a trunk room (cargo compartment), or the like when a rear view image of the host vehicle M is captured. When the host vehicle M is a 2-row seat type vehicle in which a driver's seat and a passenger seat are provided in the first row and back seats are provided in the second row, for example, the camera 10 may be attached to the side windshield of the first seat row and the side windshield of the second seat tow of the host vehicle M. The camera 10 may periodically and repeatedly images surroundings of the host vehicle M, for example. The camera 10 may be a stereo camera.

The radar device 12 radiates electric waves such as millimeter waves to the surroundings of the host vehicle M and detects electric waves (reflected waves) reflected by an object to detect at least the position (distance and direction) of the object. The radar device 12 is attached to any place on the host vehicle M. The radar device 12 may detect a position and a speed of an object according to a frequency modulated continuous wave (FM-CW) scheme.

The finder 14 is a light detection and ranging (LIDAR) device. The finder 14 radiates light to the surroundings of the host vehicle M and measures scattered light. The finder 14 detects a distance to a target on the basis of a time from light emission to light reception. The radiated light is, for example, pulsed laser light. The finder 14 is attached to any place on the host vehicle M.

The object recognition device 16 performs a sensor fusion process on detection results of some or all of the camera 10, the radar device 12, and the finder 14 to recognize a position, type, speed, and the like of the object. The object recognition device 16 outputs recognition results to the automated driving control device 100. The object recognition device 16 may output the detection results of the camera 10, the radar device 12, and the finder 14 as they are to the automated driving control device 100. The object recognition device 16 may be omitted from the vehicle system 1.

The communication device 20 communicates with other vehicles or a parking lot management device (which will be described later) present around the host vehicle M, or various server devices, for example, using a cellular network, a Wi-Fi network, Bluetooth (registered trademark), dedicated short range communication (DSRC), or the like.

The HMI 30 presents various types of information to an occupant of the host vehicle M and receives an input operation from the occupant. The HMI 30 includes a display, speakers, buzzers, touch panels, switches, keys, and the like.

The vehicle sensor 40 includes a vehicle speed sensor that detects a speed of the host vehicle M, an acceleration sensor that detects an acceleration, a yaw rate sensor that detects an angular speed around a vertical axis, and an orientation sensor that detects a direction of the host vehicle M.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 identifies a position of the host vehicle M on the basis of a signal received from a GNSS satellite. The position of the host vehicle M may be identified or corrected by an inertial navigation system (INS) using an output of the vehicle sensor 40. The navigation HMI 52 includes a display, a speaker, a touch panel, keys, and the like. The navigation HMI 52 may be partly or wholly shared with the HMI 30 described above. The route determiner 53, for example, determines a route (hereinafter, an on-map route) from the position of the host vehicle M identified by the GNSS receiver 51 (or any input position) to a destination input by the occupant using the navigation HMI 52 with reference to the first map information 54. The first map information 54 is, for example, information in which a road shape is represented by links indicating roads and nodes connected by the links. The first map information 54 is information representing road shapes according to links indicating roads and nodes connected by links, for example.

The first map information 54 may include curvatures, point of interest (POI) information, and the like of roads. The on-map route is output to the MPU 60. The navigation device 50 may perform route guidance using the navigation HMI 52 on the basis of the on-map route. The navigation device 50 may be realized, for example, by a function of a terminal device such as a smartphone or a tablet terminal possessed by the occupant. The navigation device 50 may transmit a current position and a destination to a navigation server via the communication device 20 and acquire the same route as the on-map route from the navigation server.

The MPU 60 includes, for example, a recommended lane determiner 61, and holds second map information 62 in a storage device such as an HDD or a flash memory. The recommended lane determiner 61 divides the on-map route provided from the navigation device 50 into a plurality of blocks (for example, divides the route every 100 [m] in a traveling direction of the vehicle), and determines a recommended lane for each block with reference to the second map information 62. The recommended lane determiner 61 determines in which lane from the left the host vehicle M travels.

The recommended lane determiner 61 determines the recommended lane so that the host vehicle M can travel on a reasonable route for travel to a branch destination when there is a branch place in the on-map route.

The second map information 62 is map information with higher accuracy than the first map information 54. The second map information 62 includes, for example, information on the centers of lanes or information on boundaries of the lane. The second map information 62 may include road information, traffic regulations information, address information (addresses and zip codes), facility information, telephone number information, etc. The second map information 62 may be updated at any time through communication between the communication device 20 and other devices.

The driving operator 80 includes, for example, an accelerator pedal, a brake pedal, a shift lever, a steering wheel, a modified steering wheel, a joystick and other operators, for example. A sensor that detects an operation amount or presence or absence of an operation is attached to the driving operator 80 and a detection result thereof is output to the automated driving control device 100 or some or all of the travel driving force output device 200, the brake device 210 and the steering device 220.

The automated driving control device 100 includes a first controller 120, a second controller 160 and a storage 190, for example. One or both of the first controller 120 and the second controller 160 are realized by a processor such as a central processing unit (CPU) or a graphics processing unit (GPU) executing a program (software), for example. Some or all of these components may be realized by hardware (circuit; including circuitry) such as a large scale integration (LSI) circuit, an application specific integrated circuit (ASIC), or a field-programmable gate array (FPGA) or realized by software and hardware in cooperation. The program may be stored in an HDD, a flash memory, or the like of the storage 190 in advance or may be stored in a detachable storage medium such as a DVD or a CD-ROM and installed in the storage 190 by the storage medium being mounted in a drive device.

The storage 190 is realized by, for example, an HDD, a flash memory, an electrically erasable programmable read-only memory (EEPROM), a read only memory (ROM), a random access memory (RAM), or the like. The storage 190 stores, for example, a program that is read and executed by a processor, and the like.

Figure 2:
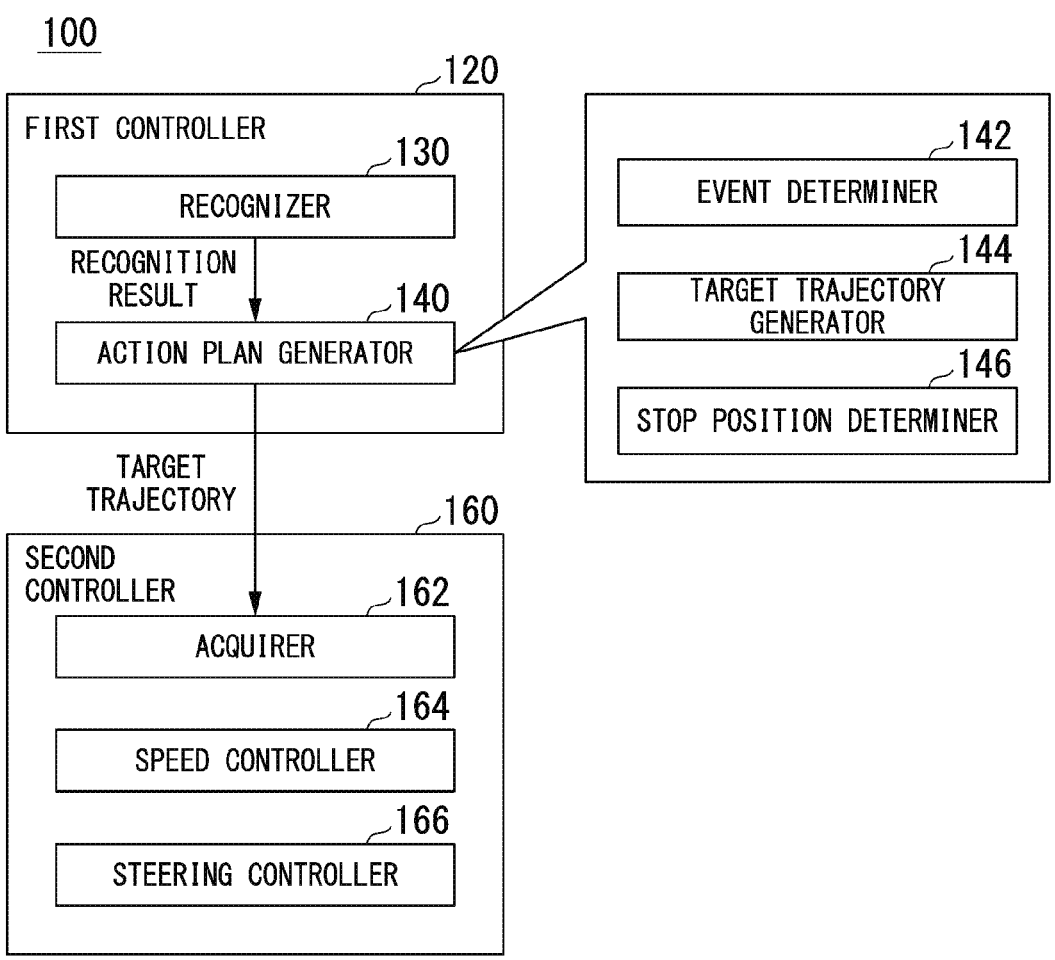
FIG. 2 is a functional configuration diagram of a first controller and a second controller.

FIG. 2 is a functional configuration diagram of the first controller 120 and the second controller 160. The first controller 120 includes, for example, a recognizer 130 and an action plan generator 140.

The first controller 120 realizes, for example, a function using artificial intelligence (AI) and a function using a previously given model in parallel. For example, a function of "recognizing an intersection" may be realized by recognition of the intersection using deep learning or the like and recognition based on previously given conditions (there is a signal which can be subjected to pattern matching, a road sign, or the like) being executed in parallel and scored for comprehensive evaluation. Accordingly, the reliability of automated driving is guaranteed.

The recognizer 130 recognizes a surroundings situation of the host vehicle M on the basis of information input from the camera 10, the radar device 12, and the finder 14 via the object recognition device 16, that is, a detection result subjected to sensor fusion. For example, the recognizer 130 recognizes a state such as a position, speed, or acceleration of an object present around the host vehicle M, as a surroundings situation. Examples of the object recognized as the surroundings situation include moving objects such as pedestrians or other vehicles, or a stationary body such as construction tools. The position of the object, for example, is recognized as a position at coordinates with a representative point (a centroid, a drive shaft center, or the like) of the host vehicle M as an origin, and is used for control. The position of the object may be represented by a representative point such as a centroid or a corner of the object or may be represented by an area having a spatial extent. The "state" of the object may include an acceleration or jerk of the object, or an "action state" (for example, whether lane change is being performed or is intended to be performed).

For example, the recognizer 130 recognizes a lane in which the host vehicle M is traveling (hereinafter referred to as a host lane), an adjacent lane adjacent to the host lane, or the like as the surroundings situation. For example, the recognizer 130 compares a pattern of a road marking line (for example, an arrangement of a solid line and a broken line) obtained from the second map information 62 with a pattern of a road marking line around the host vehicle M recognized from an image captured by the camera 10 to recognize the host lane or the adjacent lane. The recognizer 130 may recognize not only the road marking lines but also a traveling road boundary (a road boundary) including road demarcation lines, a road shoulder, a curb, a median strip, a guard rail, or the like to recognize the host lane or the adjacent lane. In this recognition, the position of the host vehicle M acquired from the navigation device 50 or a processing result of an INS may be additionally considered. The recognizer 130 may recognize a sidewalk, a stop line (including a temporary stop line), an obstacle, a red light, a toll gate, a road structure, and other road events.

The recognizer 130 recognizes a relative position or posture of the host vehicle M with respect to a host lane when recognizing the host lane. The recognizer 130 may recognize, for example, a deviation of a reference point of the host vehicle M with respect to a center of the lane and an angle formed between a vector indicating a traveling direction of the host vehicle M and a line connecting the center of the lane as the relative position and posture of the host vehicle M with respect to the host lane. Instead, the recognizer 130 may recognize, for example, a position of the reference point of the host vehicle M with respect to any one of side end portions (the road marking line or the road boundary) of the host lane as the relative position of the host vehicle M with respect to the host lane.

The recognizer 130 recognizes a motion of the face of an occupant (an example of a user) present outside the host vehicle M on the basis of information input from the camera 10, the radar device 12, and the finder 14 via the object recognition device 16 and recognizes a direction the occupant sees (hereinafter referred to as a line of sight) from the motion of the face. In other words, the recognizer 130 recognizes an object or a space in front of the line of sight of the occupant. Specifically, the recognizer 130 may recognize a line of sight according to a relative position of a comparison target such as iris with respect to a reference target such as an eye-head or an eyebrow. Here, the recognizer 130 may correct a line of sight recognized from a motion of eyes of the occupant on the basis of a direction in which the front of the body of the occupant faces or a direction in which the face faces.

The recognizer 130 may recognize a light of sight of the occupant using a deep neural network such as a convolutional neural network (CNN) or a recurrent neural network (RNN) or a model such as a support vector machine. For example, the recognizer 130 inputs an image of the camera 10 attached to each position of the host vehicle M to a model and recognizes a light of sight of the occupant on the basis of output results of the model to which the image has been input. For example, the model is a binary classification identifier trained on the basis of teacher data with which information for distinguishing whether a person is looking at a direction in which a camera is present (hereinafter, a first direction) or looking at a different direction (hereinafter, a second direction) with respect to a captured image of the face of the person is associated as a teacher label. When an image is input, a trained model classifies the image as two values (two likelihoods) indicating whether the direction of the line of sight of a person in the image is the first direction or the second direction and outputs the classification result. For example, when an image of the camera 10 attached to the trunk lid or the rear windshield is input to the model, the recognizer 130 may recognize a direction in which the trunk lid or the read windshield is present when viewed from the occupant as a direction indicating the line of sight of the occupant when the output result of the model represents that a value indicating the first direction is greater than a value indicating the second direction.

The recognizer 130 recognizes a gesture (or body language) of an occupant present outside the host vehicle M on the basis of information input from the camera 10, the radar device 12 and the finder 14 via the object recognition device 16. For example, the recognizer 130 recognizes a gesture by analyzing an action of a part of the body such as the head, the face, a hand, an arm, the upper body, or the lower body.

The action plan generator 140 includes an event determiner 142, a target trajectory generator 144, and a stop position determiner 146. The event determiner 142 determines an automated driving event on a route for which a recommended lane has been determined. Automated driving is to control one or both of the steering and speed of the host vehicle M such that the host vehicle M travels without depending on an operation of the driving operator 80 performed by the occupant of the host vehicle M. On the contrary, manual driving is to control the steering and speed of the host vehicle M according to an operation performed by the occupant on the driving operator 80. The automated driving event is information for defining movement taken by the host vehicle M in the aforementioned automated driving, that is, a travel state.

An event includes, for example, a self-traveling and parking event, a stop event, a forward traveling event, a backward traveling event, and the like. The self-traveling and parking event is an event in which the occupant of the host vehicle M does not park the host vehicle M in a parking space, but the host vehicle M is caused to autonomously travel and parked in the parking space, as in valet parking. The stop event is an event in which the host vehicle M is stopped on the spot. The forward traveling event is an event in which the host vehicle M travels forward while moving slowly. The backward traveling event is an event in which the host vehicle M travels backward while moving slowly.

The event may further include, for example, a constant speed traveling event, a following traveling event, a lane change event, a branching event, a merging event, an overtaking event, an avoidance event, or a takeover event. The constant speed traveling event is an event in which the host vehicle M is caused to travel in the same lane at a constant speed. The following traveling event is an event in which the host vehicle M is caused to follow a vehicle present within a predetermined distance (for example, within 100 [m]) ahead of the host vehicle M and closest to the host vehicle M (hereinafter referred to as a preceding vehicle). "Following" may be, for example, a traveling aspect in which a relative distance (an inter-vehicle distance) between the host vehicle M and the preceding vehicle is kept constant, or may be a traveling aspect in which the host vehicle M is caused to travel in a center of the host lane, in addition to the relative distance between the host vehicle M and the preceding vehicle being kept constant. The lane change event is an event in which the host vehicle M is caused to change lanes from the host lane to an adjacent lane. The branching event is an event in which the host vehicle M is caused to branch to a lane on the destination side at a branch point on a road. The merging event is an event in which the host vehicle M is caused to merge with a main lane at a merging point. The overtaking event is an event in which the host vehicle M is first caused to perform lane change to an adjacent lane, overtake a preceding vehicle in the adjacent lane, and then, perform lane change to an original lane again. The avoidance event is an event in which the host vehicle M is caused to perform at least one of braking and steering in order to avoid an obstacle present in front of the host vehicle M. The takeover event is an event in which the automated driving ends and switching to the manual driving occurs.

The event determiner 142 may change an event already determined for a current section or a next section to another event or determine a new event for the current section or the next section according to the surroundings situation recognized by the recognizer 130 when the host vehicle M is traveling.

The target trajectory generator 144 generates a future target trajectory in which the host vehicle M will travel in the recommended lane determined by the recommended lane determiner 61 in principle, and the host vehicle M is caused to travel automatically (without depending on a driver's operation) in a traveling aspect defined by events in order to cope with the surroundings situation when the host vehicle M travels in the recommended lane. The target trajectory includes, for example, a position element that defines a future position of the host vehicle M, and a speed element that defines a future speed, acceleration, or the like of the host vehicle M.

For example, the target trajectory generator 144 determines a plurality of points (trajectory points) that the host vehicle M is to reach in order, as the position elements of the target trajectory. The trajectory point is a point that the host vehicle M is to reach for each predetermined traveling distance (for example, several [m]). The predetermined traveling distance may be calculated, for example, using a road distance when the host vehicle M travels along the route.

The target trajectory generator 144 determines a target speed or a target acceleration at every predetermined sampling time (for example, every several tenths of a second) as the speed elements of the target trajectory. The trajectory points for each sampling time may be positions that the host vehicle M will reach at predetermined sampling times. In this case, the target speed or the target acceleration is determined using the sampling time and an interval between the trajectory points. The target trajectory generator 144 outputs information indicating the generated target trajectory to the second controller 160.

The stop position determiner 146 determines a target position (hereinafter referred to as a stop position $P_{ST}$) when the host vehicle M is stopped in each event on the basis of the line of sight of the occupant recognized by the recognizer 130.

For example, when the trunk lid is present in front of the line of sight of the occupant, that is, when the occupant is looking at the trunk lid of the host vehicle M outside the vehicle, the stop position determiner 146 determines a position at which the trunk lid is closest to the occupant (an example of a "third position") as compared to the doors of the seats in the first row including the driver's seat and the passenger seat (hereinafter referred to as front seat doors), the doors of the seats in the second row including back seats (hereinafter referred to as rear seat doors), and the like, as the stop position $P_{ST}$ of the host vehicle M.

For example, when a front seat door is present in front of the line of sight of the occupant, that is, when the occupant is looking at the front seat door of the host vehicle M outside the vehicle, the stop position determiner 146 determines a position at which the front seat door is closest to the occupant (an example of a "first position") as compared to the rear seat doors, the trunk lid, and the like, as the stop position $P_{ST}$ of the host vehicle M.

For example, when a rear seat door is present in front of the line of sight of the occupant, that is, when the occupant is looking at the rear seat door of the host vehicle M outside the vehicle, the stop position determiner 146 determines a position at which the rear seat door is closest to the occupant (an example of a "second position") as compared to the front seat doors, the trunk lid, and the like, as the stop position of the host vehicle M.

When the stop position determiner 146 determines the stop position $P_{ST}$ of the host vehicle M, the target trajectory generator 144 generates a target trajectory in which the host vehicle M will stop at the stop position $P_{ST}$. For example, the target trajectory generator 144 generates a target trajectory in which a plurality of trajectory points are arranged in time series on a route from the current position of the host vehicle M to the stop position $P_{ST}$ and a target speed is reduced as the host vehicle M approaches the stop position $P_{ST}$.

The second controller 160 controls some or all of the travel driving force output device 200, the brake device 210, and the steering device 220 such that the host vehicle M passes through the target trajectory generated by the action plan generator 140 at a scheduled time. That is, the second controller 160 automatically drives the host vehicle M on the basis of the target trajectory generated by the action plan generator 140.

The second controller 160 includes, for example, an acquirer 162, a speed controller 164, and a steering controller 166. A combination of the event determiner 142, the target trajectory generator 144, and the second controller 160 is an example of a "driving controller".

The acquirer 162 acquires information on the target trajectory (trajectory points) generated by the action plan generator 140 and stores the information on the target trajectory in a memory of the storage 190.

The speed controller 164 controls one or both of the travel driving force output device 200 and the brake device 210 on the basis of the speed element (for example, the target speed, target acceleration, or the like) included in the target trajectory stored in the memory.

The steering controller 166 controls the steering device 220 according to the position element (for example, a curvature indicating a degree of curvature of the target trajectory, or the like) included in the target trajectory stored in the memory.

Processes of the speed controller 164 and the steering controller 166 are realized by, for example, a combination of feedforward control and feedback control. For example, the steering controller 166 executes a combination of feedforward control according to a curvature of a road in front of the host vehicle M and feedback control based on a deviation of the host vehicle M with respect to the target trajectory.

The travel driving force output device 200 outputs a travel driving force (torque) for traveling of the vehicle to the driving wheels. The travel driving force output device 200 includes, for example, a combination of an internal combustion engine, an electric motor, a transmission, and the like, and a power electronic controller (ECU) that controls these. The power ECU controls the above configuration according to information input from the second controller 160 or information input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to information input from the second controller 160 or information input from the driving operator 80 so that a brake torque according to a braking operation is output to each wheel. The brake device 210 may include a mechanism that transfers the hydraulic pressure generated by the operation of the brake pedal included in the driving operator 80 to the cylinder via a master cylinder, as a backup. The brake device 210 is not limited to the configuration described above and may be an electronically controlled hydraulic brake device that controls the actuator according to information input from the second controller 160 and transfers the hydraulic pressure of the master cylinder to the cylinder.

The steering device 220 includes, for example, a steering ECU and an electric motor. The electric motor, for example, changes a direction of the steerable wheels by causing a force to act on a rack and pinion mechanism. The steering ECU drives the electric motor according to information input from the second controller 160 or information input from the driving operator 80 to change the direction of the steerable wheels.

[Self-Traveling and Parking Event—at the Time of Entry]

Figure 3:
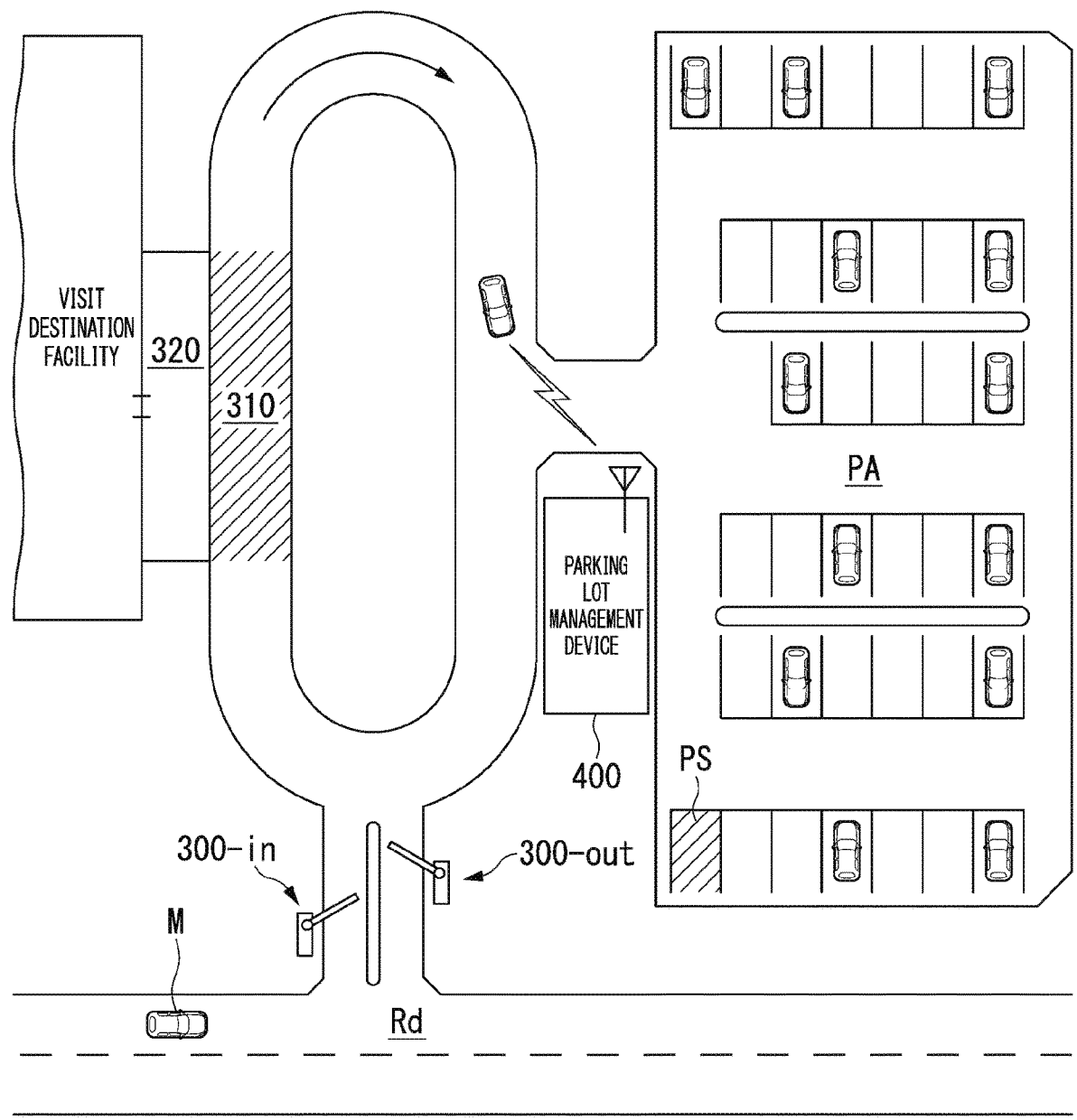
FIG. 3 is a diagram schematically showing a scene in which a self-traveling and parking event is executed.

Hereinafter, a function of the action plan generator 140 which executes the self-traveling and parking event will be described. The action plan generator 140 which executes the self-traveling and parking event parks the host vehicle M in a parking space on the basis of information acquired from a parking lot management device 400 by the communication device 20, for example. FIG. 3 is a diagram schematically showing a scene in which the self-traveling and parking event is executed. Gates 300-in and 300-out are provided on a route from a road Rd to a visit destination facility. The visit destination facility includes, for example, shopping stores, restaurants, accommodation facilities such as hotels, airports, hospitals, and event venues.

The host vehicle M passes through the gate 300-in and travels to a stop area 310 through manual driving or automated driving.

The stop area 310 is an area that faces a boarding and alighting area 320 connected to the visit destination facility, and in which a vehicle is allowed to temporarily stop in order to drop an occupant at the boarding and alighting area 320 from the vehicle or allow the occupant to board the vehicle from the boarding and alighting area 320. The boarding and alighting area 320 is an area provided so that an occupant may alight from a vehicle, board a vehicle, or wait at that point until a vehicle arrives. The boarding and alighting area 320 is typically provided on one side of a road on which the stop area 310 has been provided. An eave for avoidance of rain, snow, and sunlight may be provided in the boarding and alighting area 320.

For example, the host vehicle M that the occupant has boarded stops at the stop area 310 and drops the occupant at the boarding and alighting area 320. Thereafter, the host vehicle M performs automated driving in an unmanned manner, and starts a self-traveling and parking event in which the host vehicle M autonomously moves from the stop area 310 to a parking space PS in the parking lot PA. A start trigger of the self-traveling and parking event may be that the host vehicle M has approached to within a predetermined distance from the visit destination facility, may be that the occupant has activated a dedicated application through a terminal device such as a cellular phone, or may be that the communication device 20 has wirelessly received a predetermined signal from the parking lot management device 400, for example.

When the self-traveling and parking event is started by the action plan generator 140, the action plan generator 140 controls the communication device 20 such that a parking request is transmitted to the parking lot management device 400. When there is a space in the parking lot PA in which the vehicle can be parked, the parking lot management device 400 that has received the parking request transmits a predetermined signal as a response to the parking request to the vehicle which is a transmission source of the parking request. The host vehicle M that has received the predetermined signal moves from the stop area 310 to the parking lot PA according to guidance of the parking lot management device 400 or while performing sensing by itself. When the self-traveling and parking event is performed, the host vehicle M does not necessarily have to be unmanned, and a staff member of the parking lot PA may board the host vehicle M.

Figure 4:
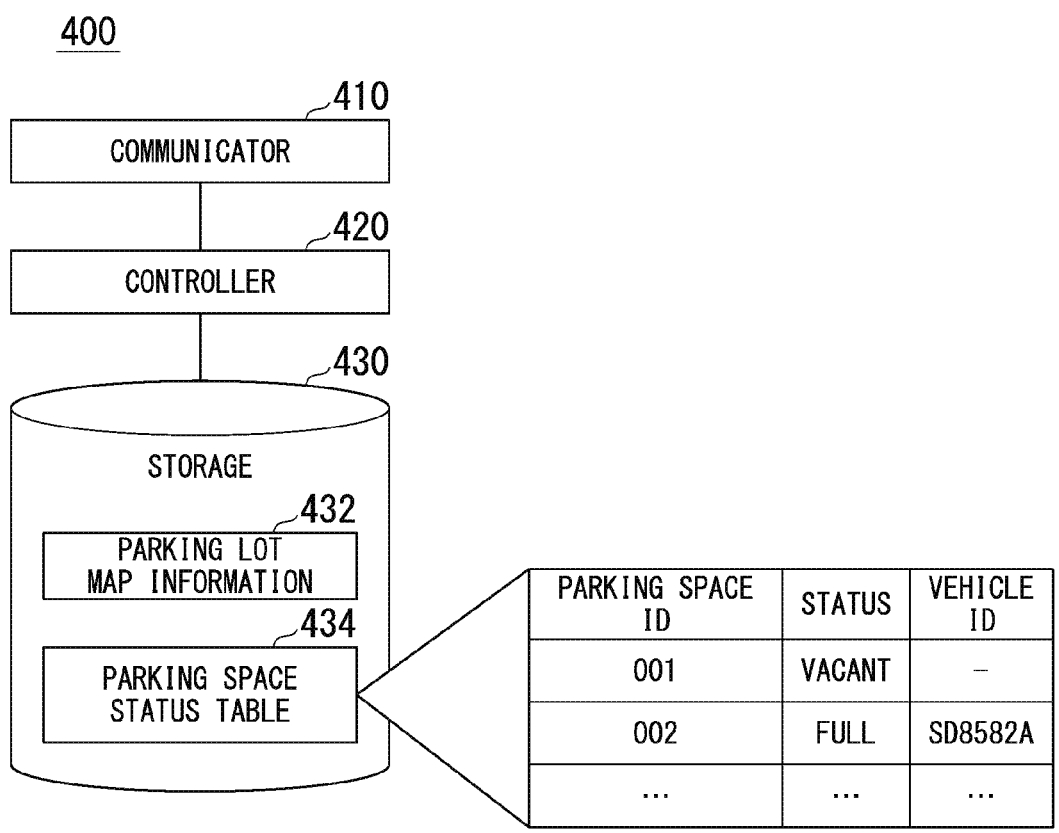
FIG. 4 is a diagram showing an example of a configuration of a parking management device.

FIG. 4 is a diagram showing an example of a configuration of the parking lot management device 400. The parking lot management device 400 includes, for example, a communicator 410, a controller 420, and a storage 430. The storage 430 stores information such as parking lot map information 432 and a parking space status table 434.

The communicator 410 wirelessly communicates with the host vehicle M or other vehicles. The controller 420 guides a vehicle to the parking space PS on the basis of the information acquired (received) by the communicator 410 and the information stored in the storage 430. The parking lot map information 432 is information that geometrically represents a structure of the parking lot PA, and includes, for example, coordinates for each parking space PS. The parking space status table 434 is, for example, a table in which a status indicating whether the parking space is in a vacant status in which no vehicle is parked in a parking space indicated by a parking space ID, which is identification information of the parking space PS or a full (parked) status in which a vehicle is parked in the parking space indicated by the parking space ID, and a vehicle ID that is identification information of parked vehicles when the parking space is in the full status are associated with the parking space ID.

When the communicator 410 receives the parking request from the vehicle, the controller 420 extracts the parking space PS that is in a vacant status with reference to the parking space status table 434, acquires a position of the extracted parking space PS from the parking lot map information 432, and transmits route information indicating a suitable route to the acquired position of the parking space PS to the vehicle using the communicator 410. The controller 420 may instruct a specific vehicle to stop or instruct the specific vehicle to slow down, as necessary, on the basis of positional relationships between a plurality of vehicles such that the vehicles do not travel to the same position at the same time.

When the host vehicle M receives the route information from the parking lot management device 400, the action plan generator 140 generates a target trajectory based on the route. For example, the action plan generator 140 may generate a target trajectory in which a speed lower than a speed limit in the parking lot PA has been set as the target speed, and trajectory points have been arranged at a center of the road in the parking lot PA on a route from a current position of the host vehicle M to the parking space PS. When the host vehicle M approaches the parking space PS that is a target, the recognizer 130 recognizes parking frame lines or the like that partition the parking space PS and recognizes a relative position of the parking space PS with respect to the host vehicle M. When the recognizer 130 has recognized the position of the parking space PS, the recognizer 130 provides a recognition result such as a direction of the recognized parking space PS (a direction of the parking space when viewed from the host vehicle M) or a distance to the parking space PS, to the action plan generator 140. The action plan generator 140 corrects the target trajectory on the basis of the provided recognition result. The second controller 160 controls the steering and the speed of the host vehicle M according to the target trajectory corrected by the action plan generator 140 such that the host vehicle M is parked in the parking space PS.

[Self-Traveling and Parking Event—at the Time of Exit]

The action plan generator 140 and the communication device 20 remain in an operating state even when the host vehicle M is parked. For example, it may be assumed that the occupant who has alighted from the host vehicle M operates the terminal device to activate the dedicated application and transmits a vehicle pick-up request to the communication device 20 of the host vehicle M. The vehicle pick-up request is a command for calling the host vehicle M from a remote place away from the host vehicle M and requesting the host vehicle M to move to a position close to the occupant.

When the vehicle pick-up request is received by the communication device 20, the action plan generator 140 executes the self-traveling and parking event. The action plan generator 140 that has executed the self-traveling and parking event generates a target trajectory for moving the host vehicle M from the parking space PS in which the host vehicle M has been parked to the stop area 310. The second controller 160 moves the host vehicle M to the stop area 310 according to the target trajectory generated by the action plan generator 140. For example, the action plan generator 140 may generate a target trajectory in which a speed lower than the speed limit in the parking lot PA has been set as the target speed, and trajectory points have been arranged at the center of the road in the parking lot PA on the route to the stop area 310.

When the host vehicle M approaches the stop area 310, the recognizer 130 recognizes the boarding and alighting area 320 facing the stop area 310 and recognizes an object such as a person or luggage present in the boarding and alighting area 320. Further, the recognizer 130 recognizes the occupant of the host vehicle M among one or more persons present in the boarding and alighting area 320. For example, when a plurality of persons are present in the boarding and alighting area 320 and a plurality of occupant candidates are present, the recognizer 130 may separately recognize the occupant of the host vehicle M and other occupants on the basis of the radio field intensity of the terminal device carried by the occupant of the host vehicle M or the radio field intensity of an electronic key by which locking, unlocking, and the like of the host vehicle M can be performed. For example, the recognizer 130 may recognize a person having a highest radio field intensity as the occupant of the host vehicle M. The recognizer 130 may separately recognize the occupant of the host vehicle M and other occupants on the basis of a feature quantity of the face of each occupant candidate, or the like. When the host vehicle M approaches the occupant of the host vehicle M, the action plan generator 140 further decreases the target speed or moves trajectory points from the center of the road to a position close to the boarding and alighting area 320 to correct the target trajectory. Then, the second controller 160 causes the host vehicle M to stop at a position close to the side of the boarding and alighting area 320 in the stop area 310.

When the action plan generator 140 generates the target trajectory in response to the vehicle pick-up request, the action plan generator 140 controls the communication device 20 such that a travel start request is transmitted to the parking lot management device 400. When the travel start request is received by the communicator 410, the controller 420 of the parking lot management device 400 instructs a specific vehicle to stop or slow down, as necessary, such that vehicles do not travel to the same position at the same time on the basis of the positional relationship between the plurality of vehicles, as in the time of the entry. When the host vehicle M moves to the stop area 310 and the occupant in the boarding and alighting area 320 boards the host vehicle M, the action plan generator 140 ends the self-traveling and parking event. Thereafter, the automated driving control device 100 plans a merging event in which the host vehicle M merges from the parking lot PA to a road in a city area, or the like and performs automated driving on the basis of the planned event, or the occupant himself or herself manually drives the host vehicle M.

The present invention is not limited to the above, and the action plan generator 140 may find the parking space PS in a vacant status by itself on the basis of detection results of the camera 10, the radar device 12, the finder 14, or the object recognition device 16 without depending on communication, and park the host vehicle M in the found parking space PS.

[Process Flow at the Time of Exit]

Figure 5:
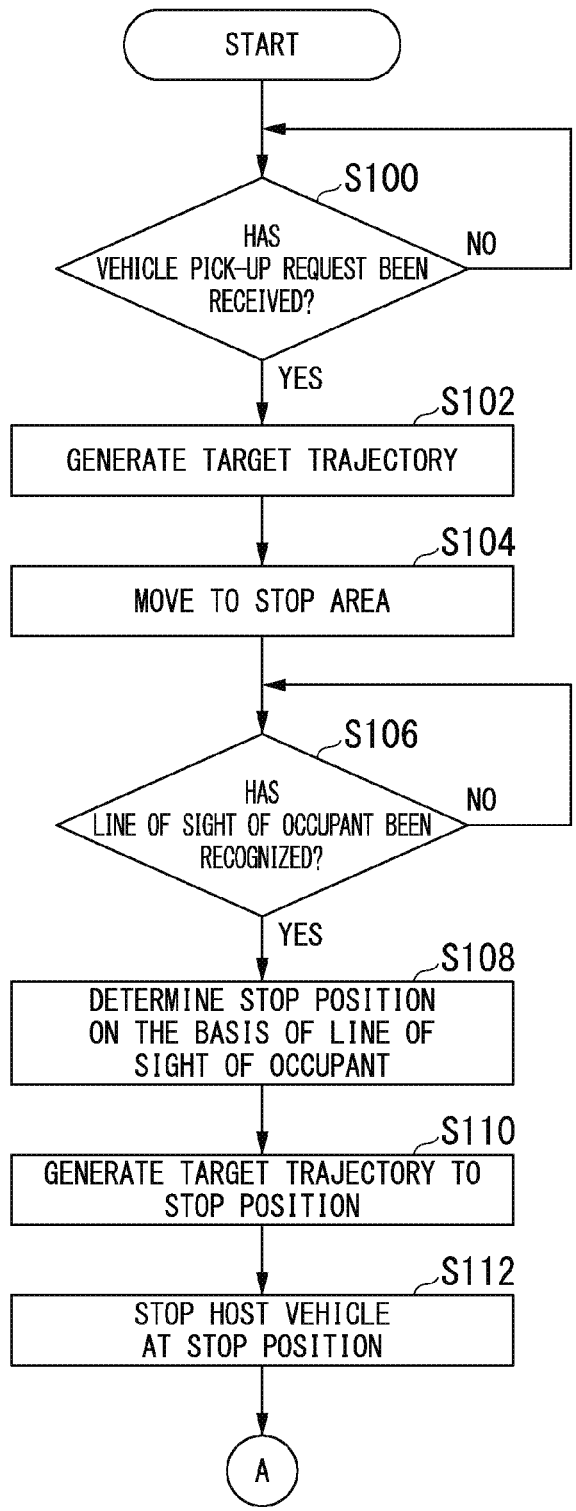
FIG. 5 is a flowchart showing an example of a series of processes performed by an automated driving control device according to a first embodiment.
Figure 6:
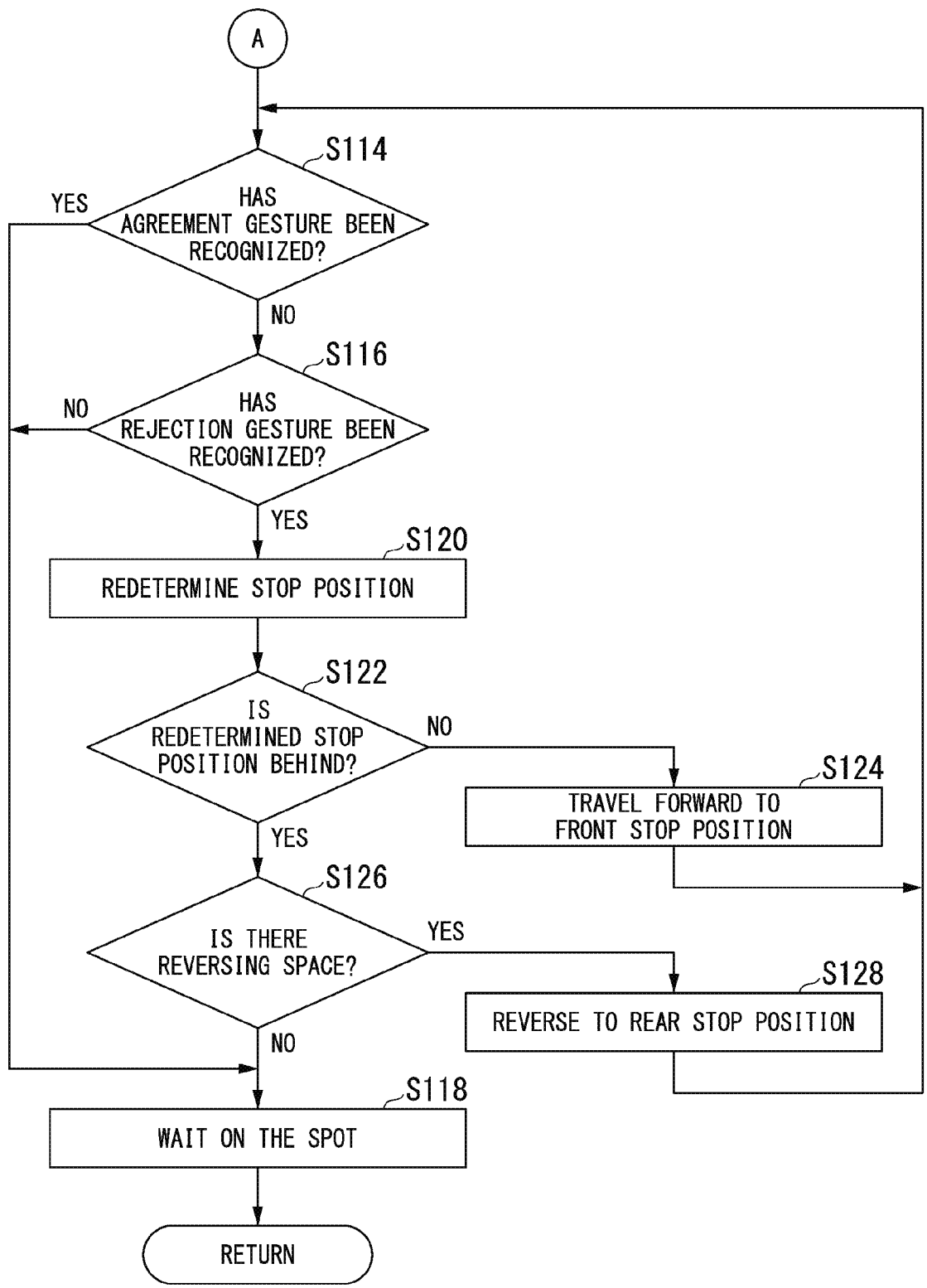
FIG. 6 is a flowchart showing an example of a series of processes performed by the automated driving control device according to the first embodiment.

Hereinafter, a series of processes of the automated driving control device 100 at the time of exit will be described using a flowchart. FIG. 5 and FIG. 6 are flowcharts showing an example of the series of processes of the automated driving control device 100 according to the first embodiment. A process of the flowcharts may be repeatedly performed at predetermined time intervals, for example. It is assumed that the recognizer 130 continues to perform various recognitions unless otherwise specified while the process of the flowcharts is being performed.

First, the event determiner 142 of the action plan generator 140 waits until the vehicle pick-up request is received by the communication device 20 (step S100) and determines an event of a route to the stop area 310 as the self-traveling and parking event when the vehicle pick-up request is received by the communication device 20. Then, the target trajectory generator 144 generates a target trajectory for moving the host vehicle M from the parking space PS in which the host vehicle M has been parked to the stop area 310 (step S102).

Then, the second controller 160 performs automated driving on the basis of the target trajectory generated by the target trajectory generator 144 when the vehicle pick-up request has been received such that the host vehicle M moves to the stop area 310 (step S104).

Then, when the host vehicle M approaches the stop area 310, the stop position determiner 146 waits until the recognizer 130 recognizes the line of sight of an occupant present in the boarding and alighting area 320 facing the stop area 310 (step S106) and determines a stop position $P_{ST}$ at which the host vehicle M will stop in the stop area 310 on the basis of the line of sight of the occupant when the line of sight of the occupant is recognized by the recognizer 130 (step S108).

Figure 7:
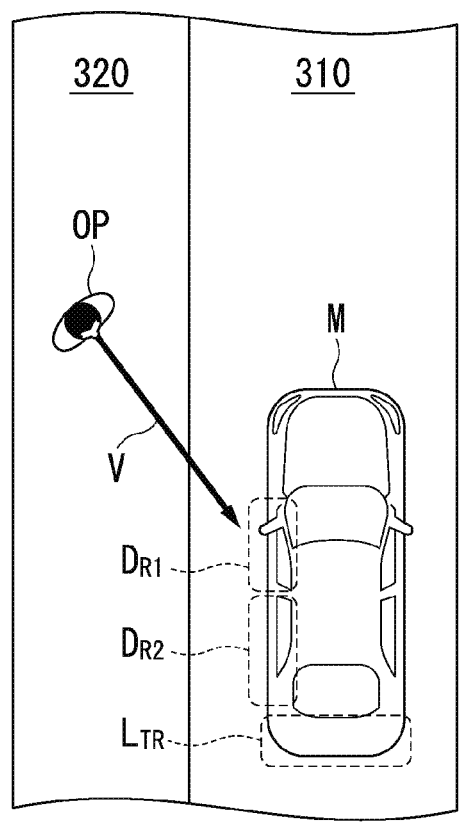
FIG. 7 is a diagram showing an example of a scene in which a host vehicle has arrived at a stop area.

FIG. 7 is a diagram showing an example of a scene in which the host vehicle M has arrived at the stop area 310. In the figure, OP represents the occupant of the host vehicle M, V represents the line of sight of the occupant OP recognized by the recognizer 130, $D_{R1}$ represents a front seat door of the host vehicle M, $D_{R2}$ represents a rear seat door of the host vehicle M, and $L_{TR}$ represents the trunk lid of the host vehicle M. For example, the stop position determiner 146 determines the stop position $P_{ST}$ according to which part of the body of the host vehicle M is viewed by the occupant OP when the host vehicle M has arrived at the stop area 310. In the shown example, since the front seat door $D_{R1}$ is present in front of the line of sight V of the occupant OP, the stop position determiner 146 determines a position at which the front seat door $D_{R1}$ becomes closest to the occupant OP as compared to the rear seat door $D_{R2}$ and the trunk lid $L_{TR}$ as the stop position $P_{ST}$ of the host vehicle M.

Then, the target trajectory generator 144 generates a target trajectory to the stop position $P_{ST}$ determined by the stop position determiner 146 (step S110). Then, the second controller 160 controls at least one or both of the speed and steering of the host vehicle M on the basis of the target trajectory generated by the target trajectory generator 144 in the process of S110 such that the host vehicle M stops at the stop position $P_{ST}$ (step S112).

Figure 8:
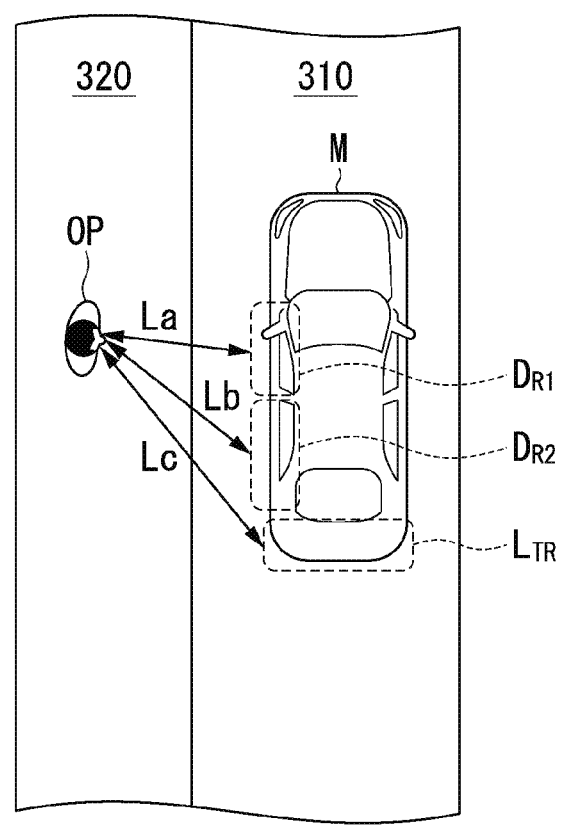
FIG. 8 is a diagram showing an example of a scene in which the host vehicle is caused to stop at a stop position.

FIG. 8 is a diagram showing an example of a scene in which the host vehicle M is caused to stop at the stop position $P_{ST}$. In the figure, La represents a distance between the occupant OP and the front seat door $D_{R1}$ (hereinafter referred to as a first distance), Lb represents a distance between the occupant OP and the rear seat door $D_{R2}$ (hereinafter referred to as a second distance), and Lc represents a distance between the occupant OP and the trunk lid $L_{TR}$ (hereinafter referred to as a third distance). When the front seat door $D_{R1}$ is present in front of the line of sight V of the occupant OP, a position at which the front seat door $D_{R1}$ becomes closest to the occupant OP as compared to the rear seat door $D_{R2}$ and the trunk lid $L_{TR}$ is determined as the stop position $P_{ST}$ as in the scene shown in FIG. 7. Accordingly, when the host vehicle M stops at the stop position $P_{ST}$, the first distance La among the first distance La, the second distant Lb, and the third distance Lc is shortest. When the occupant in the boarding and alighting area 320 gazes at a part of the body of the host vehicle M that has approached in the stop area 310 in this manner, the host vehicle M stops such that the part of the body at which the occupant gazes becomes closest to the occupant. Accordingly, when the occupant is holding luggage, for example, the host vehicle M actively approaches the occupant such that a seat or the trunk into which the occupant wants to load the luggage is positioned in front of the occupant when the occupant gazes at the seat or the trunk without moving. As a result, it is possible to improve convenience when the host vehicle M is used.

A description returns to the flowcharts of FIG. 5 and FIG. 6. Then, the stop position determiner 146 determines whether the recognizer 130 has recognized that the occupant present in the boarding and alighting area 320 has made an agreement gesture after the host vehicle M has stopped at the stop position $P_{ST}$ (step S114).

The agreement gesture is a gesture of expressing the occupant's intention that the host vehicle M need not be moved from the position intended by the occupant at which the host vehicle M has stopped. For example, the agreement gesture is a gesture of shaking the head up and down. The agreement gesture is an example of a "first gesture".

When the recognizer 130 has not recognized the agreement gesture after the host vehicle M has stopped at the stop position $P_{ST}$, the stop position determiner 146 further determines whether the recognizer 130 has recognized that the occupant present in the boarding and alighting area 320 has made a rejection gesture (step S116).

The rejection gesture is a gesture of expressing the occupant's intention that the host vehicle M needs to be moved from a position intended by the occupant without causing the host vehicle M to stop at the position. For example, the rejection gesture is a gesture of shaking the head side to side. The rejection gesture is an example of a "second gesture".

When the recognizer 130 has recognized the agreement gesture after the host vehicle M has stopped at the stop position $P_{ST}$ or the recognizer 130 has not recognized both the agreement gesture and the rejection gesture, the stop position determiner 146 does not change the stop position $P_{ST}$ determined in the process of S108. Then, the target trajectory generator 144 generates a target trajectory for continuously stopping the host vehicle M at the stop position $P_{ST}$ and the second controller 160 causes the host vehicle M to wait at that location by controlling at least one of the steering and speed of the host vehicle M on the basis of the target trajectory (step S118).

On the other hand, when the recognizer 130 has not recognized the agreement gesture and has recognized the rejection gesture after the host vehicle M has stopped at the stop position $P_{ST}$, the stop position determiner 146 redetermines the stop position $P_{ST}$ on the basis of the line of sight of the occupant who has made the rejection gesture (step S120). In the following description, in order to distinguish the stop position $P_{ST}$ determined in the process of S108 from the stop position $P_{ST}$ redetermined in the process of S120, the former is referred to as a "first stop position $P_{ST}$" and the latter is referred to as a "second stop position $P_{ST}$".

Then, the target trajectory generator 144 determines whether the second stop position $P_{ST}$ determined by the stop position determiner 146 is present behind the first stop position $P_{ST}$ in the traveling direction of the host vehicle M (step S122). When the second stop position $P_{ST}$ is present in front of the first stop position $P_{ST}$ rather than behind the first stop position $P_{ST}$, the target trajectory generator 144 generates a target trajectory for causing the host vehicle M to travel forward. Then, the second controller 160 causes the host vehicle M to travel forward from the first stop position $P_{ST}$ to the second stop position $P_{ST}$ (step S124). Then, the target trajectory generator 144 returns to the process of S114.

On the other hand, when the second stop position $P_{ST}$ is present behind the first stop position $P_{ST}$, the target trajectory generator 144 determines whether there is a space to which the host vehicle M can be reversed (hereinafter referred to as a reversing space) on the basis of a situation of the back of the host vehicle M recognized by the recognizer 130 (step S126).

For example, the reversing space may be determined on the basis of a relative positional relationship between a part of the body of the host vehicle M (e.g., the front seat door $D_{R1}$, the rear seat door $D_{R2}$, and the trunk lid $L_{TR}$) which is used as a criterion when the first stop position $P_{ST}$ is determined and a part of the body of the host vehicle M which is used as a criterion when the second stop position $P_{ST}$ is determined.

Specifically, when a position at which the front seat door $D_{R1}$ is closest to the occupant OP is determined as the first stop position $P_{ST}$ and a position at which the trunk lid $L_{TR}$ is closest to the occupant OP is determined as the second stop position $P_{ST}$, or when a position at which the trunk lid $L_{TR}$ is closest to the occupant OP is determined as the first stop position $P_{ST}$ and a position at which the front seat door $D_{R1}$ is closest to the occupant OP is determined as the second stop position $P_{ST}$, the reversing space is set to a largest size in the traveling direction of the host vehicle M (e.g., the overall length of the host vehicle M).

In the cases in which a position at which the front seat door $D_{R1}$ is closest to the occupant OP is determined as the first stop position $P_{ST}$ and a position at which the rear seat door $D_{R2}$ is closest to the occupant OP is determined as the second stop position $P_{ST}$, and a position at which the rear seat door $D_{R2}$ is closest to the occupant OP is determined as the first stop position $P_{ST}$ and a position at which the trunk lid $L_{TR}$ is closest to the occupant OP is determined as the second stop position $P_{ST}$, or cases opposite to these cases, the reversing space is set to a second largest size in the traveling direction of the host vehicle M.

The target trajectory generator 144 generates a target trajectory for causing the host vehicle M to travel backward when it is determined that there is a reversing space. Then, the second controller 160 causes the host vehicle M to travel backward from the first stop position $P_{ST}$ to the second stop position $P_{ST}$ (step S128). Then, the target trajectory generator 144 returns to the process of S114.

On the other hand, when it is determined that there is no reversing space, the target trajectory generator 144 proceeds to the process of S118 and generates a target trajectory for continuously stopping the host vehicle M at the first stop position $P_{ST}$. Then, the second controller 160 causes the host vehicle M to wait at the first stop position $P_{ST}$. Accordingly, the process of this flowchart ends.

Figure 9:
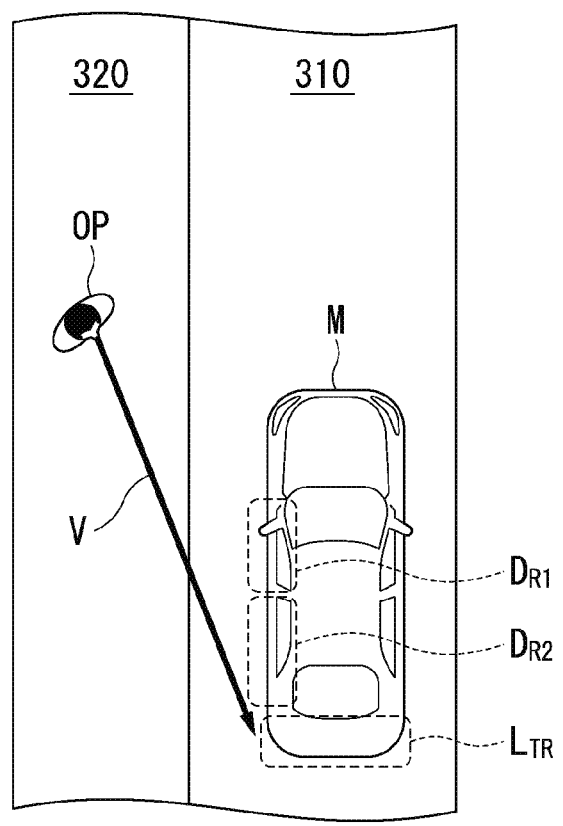
FIG. 9 is a diagram showing another example of the scene in which the host vehicle has arrived at the stop area.

FIG. 9 is a diagram showing another example of a scene in which the host vehicle M has arrived at the stop area 310. In the shown example, since the trunk lid $L_{TR}$ is present in front of the line of sight V of the occupant OP, the stop position determiner 146 determines a position at which the trunk lid $L_{TR}$ is closest to the occupant OP as compared to the front seat door $D_{R1}$ and the rear seat door $D_{R2}$ as the first stop position $P_{ST}$ of the host vehicle M.

Figure 10:
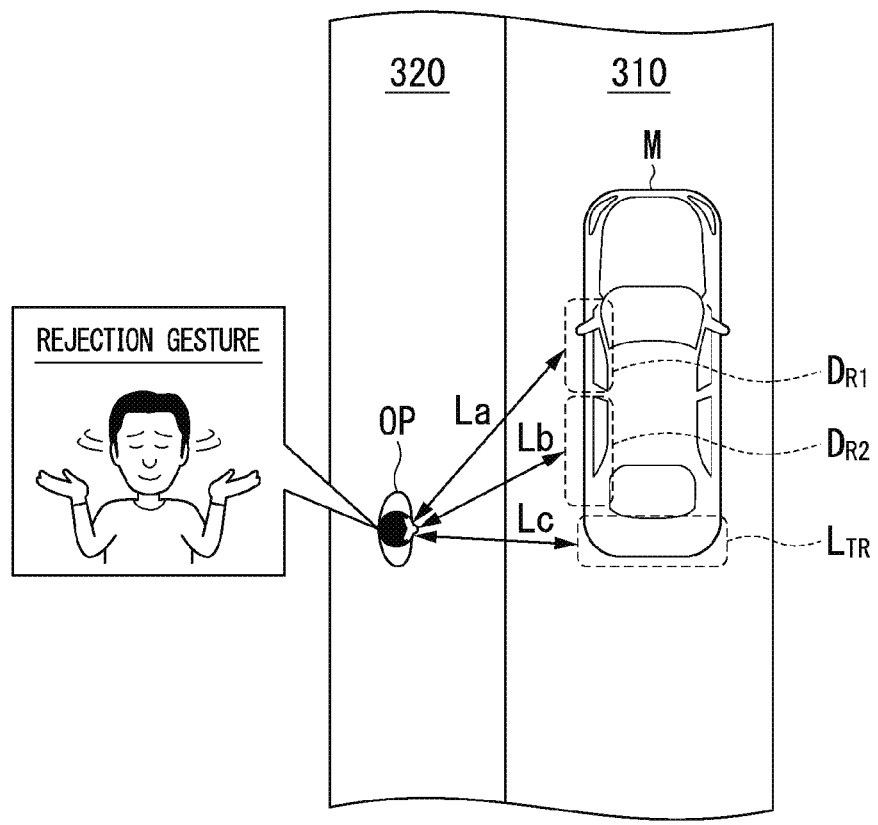
FIG. 10 is a diagram showing an example of a scene in which the host vehicle is caused to stop at a first stop position.

FIG. 10 a diagram showing an example of a scene in which the host vehicle M is caused to stop at the first stop position $P_{ST}$. As in the scene shown in FIG. 9, when the trunk lid $L_{TR}$ is present in front of the line of sight V of the occupant OP, the first stop position $P_{ST}$ is determined as a position at which the trunk lid $L_{TR}$ is closest to the occupant OP as compared to the front seat door $D_{R1}$ and the rear seat door $D_{R2}$. Accordingly, when the host vehicle M is stopped at the first stop position $P_{ST}$, the third distance Lc among the first distance La, the second distance Lb, and the third distance Lc is shortest.

When the occupant OP makes the rejection gesture when the host vehicle M has stopped at the first stop position $P_{ST}$ at which the trunk lid $L_{TR}$ is closest to the occupant OP, the stop position determiner 146 determines the second stop position $P_{ST}$ on the basis of the line of sight of the occupant who makes the rejection gesture.

Figure 11:
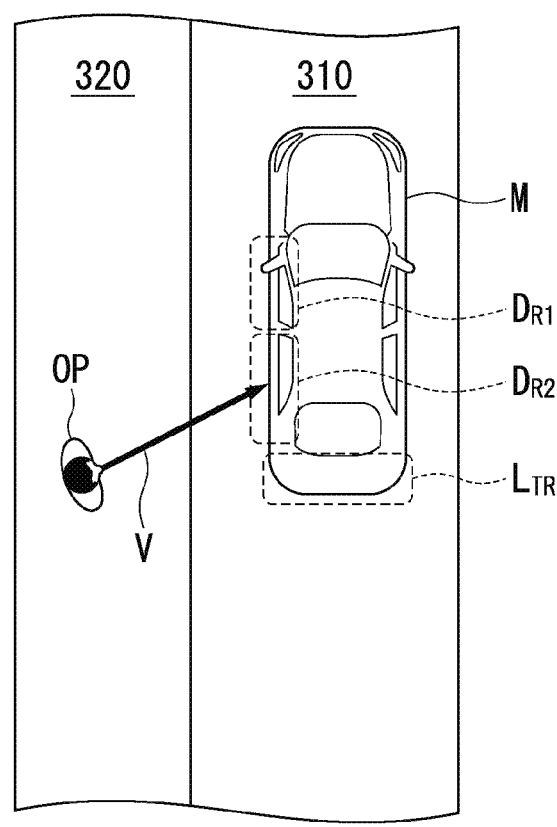
FIG. 11 is a diagram showing an example of a scene after a rejection gesture is performed.

FIG. 11 is a diagram showing an example of a scene after the rejection gesture has been made. In the scene shown in FIG. 11, the rear seat door $D_{R2}$ is present in front of the line of sight V of the occupant P who has made the rejection gesture. Accordingly, the stop position determiner 146 determines a position at which the rear seat door $D_{R2}$ is closest to the occupant OP as compared to the front seat door $D_{R1}$ and the trunk lid $L_{TR}$ as the second stop position $P_{ST}$ of the host vehicle M.

Figure 12:
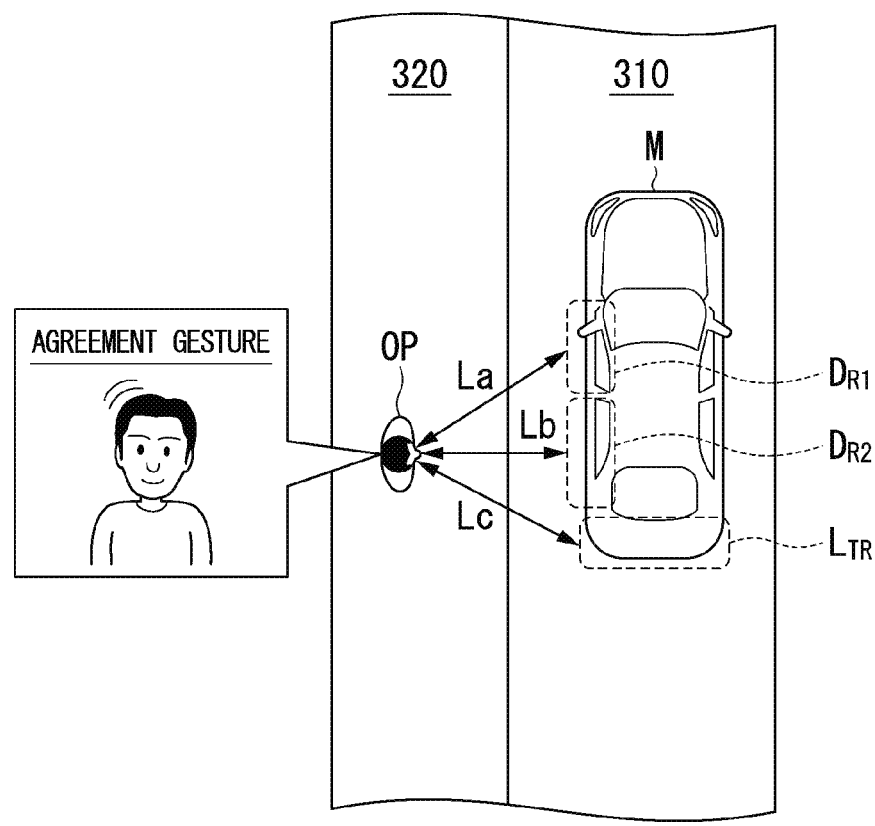
FIG. 12 is a diagram showing an example of a scene in which the host vehicle is caused to stop at a second stop position.

FIG. 12 is a diagram showing an example of a scene in which the host vehicle M is caused to be stopped at the second stop position $P_{ST}$. As in the scene shown in FIG. 11, when the rear seat door $D_{R2}$ is present in front of the line of sight V of the occupant OP who makes the rejection gesture, a position at which the second distance Lb among the first distance La, the second distance Lb, and the third distance Lc is shortest is determined as the second stop position $P_{ST}$ and thus the second controller 160 causes the host vehicle M to be reversed as in the shown example if there is a reversing space behind the host vehicle M. Here, when the occupant OP makes the agreement gesture, the second controller 160 causes the host vehicle to wait at the second stop position $P_{ST}$.

In this manner, when the line of sight of the occupant OP is recognized, the host vehicle M is moved according to automated driving such that a part of the vehicle body present in front of the line of sight becomes closest to the occupant OP, and when the occupant OP makes the rejection gesture, the line of sight of the occupant OP is re-recognized and the host vehicle M is moved according to automated driving such that a part of the vehicle body present in front of the line of sight becomes closest to the occupant OP. Accordingly, it is possible to move the host vehicle M to a position agreed (desired) by the occupant OP.

According to the above-described first embodiment, the recognizer 130 which recognizes a motion of the face of the occupant OP present outside the host vehicle M and recognizes a line of sight of the occupant OP on the basis of the recognized motion of the face, the stop position determiner 146 which determines the stop position $P_{ST}$ (first stop position $P_{ST}$) of the host vehicle M on the basis of the line of sight of the occupant OP recognized by the recognizer 130, the target trajectory generator 144 which generates a target trajectory to the stop position $P_{ST}$ determined by the stop position determiner 146, and the second controller 160 which controls at least one of the speed and steering of the host vehicle M on the basis of the target trajectory generated by the target trajectory generator 144 are included. Accordingly, it is possible to remotely control the host vehicle M on the basis of a motion of the face of the occupant outside the vehicle.

According to the above-described first embodiment, the stop position determiner 146 does not change the stop position $P_{ST}$ when the recognizer 130 has recognized an agreement gesture after the host vehicle M has moved to the stop position $P_{ST}$ and redetermines the stop position $P_{ST}$ when the recognizer 130 has recognized a rejection gesture after the host vehicle M has moved to the first stop position $P_{ST}$, and thus it is possible to move the host vehicle M to a position agreed (desired) by the occupant OP.

Second Embodiment

Hereinafter, a second embodiment will be described. In the first embodiment, a case in which the stop position $P_{ST}$ is determined according to a position of the body of the host vehicle M which is present in front of the line of sight of the occupant OP when the occupant OP gazes at the host vehicle M outside the vehicle has been described. On the other hand, the second embodiment differs from the first embodiment in that, when the occupant OP outside the vehicle gazes at a road on which the host vehicle M will travel, the stop position $P_{ST}$ is determined according to a position on the road surface which is present in front of the line of sight of the occupant OP. Hereinafter, differences between the second embodiment and the first embodiment will be mainly described, and description of aspects common to the second embodiment and the first embodiment will be omitted. In the description of the second embodiment, portions that are the same as in the first embodiment are denoted with the same reference signs.

When the road surface of the stop area 310 is in front of the line of sight of the occupant OP, that is, the occupant OP is looking at the road surface of the stop area 310, the stop position determiner 146 according to the second embodiment determines the region of the road surface in front of the line of sight as the stop position $P_{ST}$ of the host vehicle M.

Figure 13:
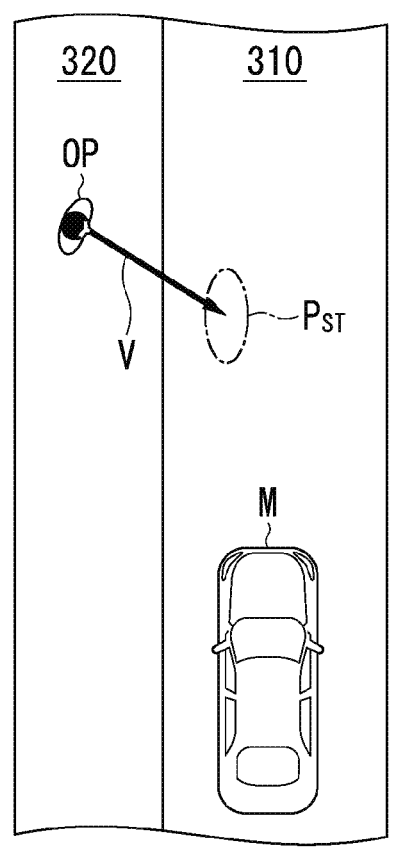
FIG. 13 is a diagram showing another example of the scene in which the host vehicle has arrived at the stop area.

FIG. 13 is a diagram showing another example of a scene in which the host vehicle M has arrived at the stop area 310. In the shown example, since the road surface of the stop area 310 is present in front of the line of sight V of the occupant OP, the stop position determiner 146 determines the region of the road surface in front of the line of sight as the stop position $P_{ST}$ of the host vehicle M. Specifically, the stop position determiner 146 may determine a point at which the line of sight V intersects the road surface as the stop position $P_{ST}$ or determine a region included in a circle or an oval having the point at which the line of sight V intersects the road surface as a center as the stop position $P_{ST}$.

Figure 14:
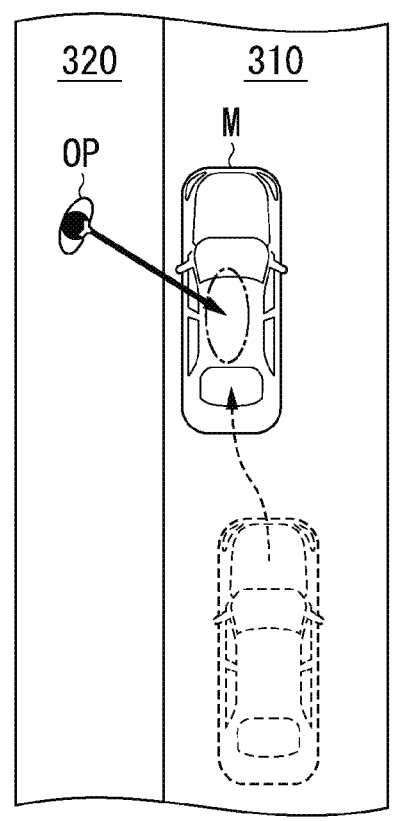
FIG. 14 is a diagram showing another example of the scene in which the host vehicle is caused to stop at the stop position

FIG. 14 is a diagram showing another example of a scene in which the host vehicle M is caused to stop at the stop position $P_{ST}$. As in the scene shown in FIG. 13, when a part of the road surface of the stop area 310 is determined as the stop position $P_{ST}$, the target trajectory generator 144 generates a target trajectory from a current position of the host vehicle M to the stop position $P_{ST}$ on the road surface and the second controller 160 controls the speed and steering of the host vehicle M on the basis of the target trajectory. Accordingly, the host vehicle M moves to the position in front of the line of sight of the occupant OP, as shown in FIG. 14.

According to the above-described second embodiment, when the road surface of the stop area 310 is present in front of the line of sight V of the occupant OP, a part of the road surface of the stop area 310 is determined as the stop position $P_{ST}$, and thus it is possible to remotely control the host vehicle M on the basis of a motion of the face of the occupant outside the vehicle as in the first embodiment.

Other Embodiments

Hereinafter, other embodiments (modified examples) will be described. Although a case in which the stop position determiner 146 determines the stop position $P_{ST}$ of the host vehicle M on the basis of the line of sight of the occupant OP waiting in the boarding and alighting area 320 when the host vehicle M is caused to move from the parking lot PA to the stop area 310 facing the boarding and alighting area 320 connected to a visit destination facility through automated driving as in valet parking has been described in the first embodiment or the second embodiment, the present invention is not limited thereto. For example, the stop position determiner 146 may determine the stop position $P_{ST}$ when the host vehicle M is caused to stop on a road on the basis of the line of sight of the occupant OP when the occupant OP is waiting at the shoulder of the road.

[Hardware Configuration]

Figure 15:
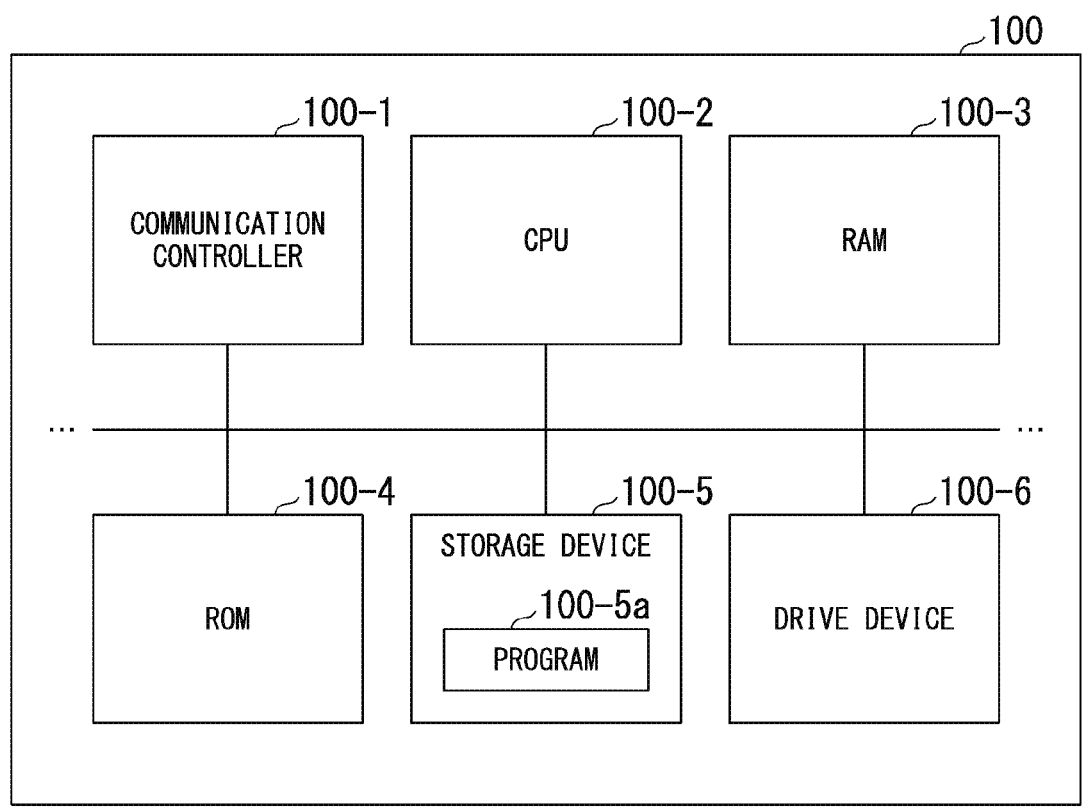
FIG. 15 is a diagram showing an example of a hardware configuration of an automated driving control device according to the embodiment.

FIG. 15 is a diagram showing an example of a hardware configuration of the automated driving control device 100 according to the embodiment. As shown, the automated driving control device 100 has a configuration in which a communication controller 100-1, a CPU 100-2, a RAM 100-3 that is used as a working memory, a ROM 100-4 that stores a boot program or the like, a storage device 100-5 such as a flash memory or an HDD, a drive device 100-6, and the like are connected to each other by an internal bus or a dedicated communication line. The communication controller 100-1 communicates with components other than the automated driving control device 100. A program 100-5a to be executed by the CPU 100-2 is stored in the storage device 100-5. This program is developed in the RAM 100-3 by a direct memory access (DMA) controller (not shown) or the like and executed by the CPU 100-2. Thereby, one or both of the first controller 120 and the second controller 160 are realized.

The embodiment described above can be represented as follows.

A vehicle control apparatus including a storage which stores a program and a processor, in which the processor is configured, by executing the program, to recognize a motion of the face of a user present outside a vehicle, to determine a stop position of the vehicle on the basis of the recognized motion of the face, and to control at least the speed of the vehicle such that the vehicle is caused to stop at the determined stop position.

While forms for carrying out the present invention have been described using the embodiments, the present invention is not limited to these embodiments at all, and various modifications and substitutions can be made without departing from the gist of the present invention.

What is claimed is:

1. A vehicle control apparatus comprising:
a processor; and
a memory that stores executable instructions that, when executed by the processor, facilitate performance of operations, comprising:
recognizing a motion of a face of a user present outside a vehicle;
determining a stop position of the vehicle on a basis of the motion of the face;
controlling at least a speed of the vehicle such that the vehicle is caused to stop at the stop position, wherein seats arranged in at least two rows in a traveling direction and a cargo compartment are provided in the vehicle;
recognizing a line of sight of the user as the motion of the face; and
determining, as the stop position, any of a first position at which the user is closest to a seat in a first row, a second position at which the user is closest to a seat in a second row, and a third position at which the user is closest to the cargo compartment on a basis of the line of sight recognized.

2. The vehicle control apparatus according to claim 1, wherein the operations further comprise:
changing the stop position when a first gesture after the vehicle has moved to the stop position is recognized, and redetermining the stop position when a second gesture different from the first gesture after the vehicle has moved to the stop position is recognized.

3. The vehicle control apparatus according to claim 2, wherein the first gesture is an action that the user takes when the user agrees to the stop position and the second gesture is an action that the user takes when the user does not agree to the stop position.

4. The vehicle control apparatus according to claim 2, wherein the operations further comprise:
redetermining the stop position on the basis of the line of sight recognized when the second gesture is recognized.

5. The vehicle control apparatus according to claim 2, wherein the operations further comprise:
causing the vehicle to move to the redetermined stop position when the stop position is redetermined.

6. A vehicle control method, using an in-vehicle computer, comprising:
recognizing a motion of a face of a user present outside a vehicle;
determining a stop position of the vehicle on a basis of the recognized motion of the face; and
controlling at least a speed of the vehicle such that the vehicle is caused to stop at the stop position,
wherein seats arranged in at least two rows in a traveling direction and a cargo compartment are provided in the vehicle, and
the vehicle control method further comprising:
recognizing a line of sight of the user as the motion of the face; and
determining, as the stop position, any of a first position at which the user is closest to a seat in a first row, a second position at which the user is closest to a seat in a second row, and a third position at which the user is closest to the cargo compartment on a basis of the line of sight recognized.

7. A computer-readable non-transitory storage medium storing a program for causing an in-vehicle computer to execute:
recognition of a motion of a face of a user present outside a vehicle;
determination of a stop position of the vehicle on a basis of the recognized motion of the face; and
control of at least a speed of the vehicle such that the vehicle is caused to stop at the stop position,
wherein seats arranged in at least two rows in a traveling direction and a cargo compartment are provided in the vehicle, and
the program causes the in-vehicle computer to further execute:

recognition a line of sight of the user as the motion of the face; and determination, as the stop position, any of a first position at which the user is closest to a seat in a first row, a second position at which the user is closest to a seat in a second row, and a third position at which the user is closest to the cargo compartment on a basis of the line of sight recognized.

\* \* \* \* \*